(12) United States Patent
Chen et al.

(10) Patent No.: US 10,763,706 B2
(45) Date of Patent: Sep. 1, 2020

(54) WIRELESS CHARGING SYSTEM WITH POWER LEVEL CALCULATION CIRCUIT FOR FOREIGN OBJECT DETECTION

(71) Applicant: NXP B.V., Eindhoven (NL)

(72) Inventors: Fei Chen, Shanghai (CN); Gang Li, Shanghai (CN); Ping Zhao, Shanghai (CN)

(73) Assignee: NXP B.V., San Jose, CA (US)

( * ) Notice: Subject to any disclaimer, the term of this patent is extended or adjusted under 35 U.S.C. 154(b) by 251 days.

(21) Appl. No.: 16/028,378

(22) Filed: Jul. 5, 2018

(65) Prior Publication Data

US 2019/0181692 A1 Jun. 13, 2019

(30) Foreign Application Priority Data

Dec. 12, 2017 (CN) .......................... 2017 1 1323963

(51) Int. Cl.
*H02J 50/60* (2016.01)
*H02J 50/80* (2016.01)
*H02J 7/02* (2016.01)

(52) U.S. Cl.
CPC .............. *H02J 50/60* (2016.02); *H02J 7/025* (2013.01); *H02J 50/80* (2016.02)

(58) Field of Classification Search
CPC .............. H02J 50/60; H02J 7/025; H02J 50/80
See application file for complete search history.

(56) References Cited

U.S. PATENT DOCUMENTS

| 8,983,374 | B2 | 3/2015 | Wiley |
| 9,178,387 | B2 | 11/2015 | Mohammadian et al. |
| 9,450,648 | B2 | 9/2016 | Bastami |
| 9,465,064 | B2 | 10/2016 | Roy et al. |
| 9,474,031 | B1 | 10/2016 | Sedzin et al. |
| 9,530,558 | B2 | 12/2016 | Nakano et al. |
| 9,614,395 | B2 * | 4/2017 | Chiang ................... H02J 7/025 |
| 2013/0069441 | A1 | 3/2013 | Verghese |
| 2013/0094598 | A1 | 4/2013 | Bastami |
| 2013/0257165 | A1 | 10/2013 | Singh |
| 2013/0257168 | A1 | 10/2013 | Singh |
| 2014/0015329 | A1 | 1/2014 | Widmer |
| 2014/0015522 | A1 | 1/2014 | Widmer et al. |
| 2014/0049422 | A1 | 2/2014 | Von Novak |

(Continued)

FOREIGN PATENT DOCUMENTS

CN 205027804 U 2/2016

*Primary Examiner* — Jared Fureman
*Assistant Examiner* — Duc M Pham

(57) ABSTRACT

In a wireless charging system, a power-transmitting node (TX) has a transmitter for transmitting power wirelessly to a power-receiving node (RX), and a signal receiver for receiving signals from the RX. During a power-transfer session, the TX accumulates data corresponding to its transmitted power level, detects an end of a received power (RP) packet from the RX, and then identifies a subset of the accumulated data. The TX calculates its transmitted power level using the subset of the accumulated data. The TX extracts a received power level of the RX from the received RP packet and compares its calculated transmitted power level with the RX's received power level to determine a presence of a foreign object. Accuracy of FO detection when packets from the RX are not properly received by the TX is improved.

18 Claims, 4 Drawing Sheets

(56) References Cited

U.S. PATENT DOCUMENTS

| | | |
|---|---|---|
| 2014/0084857 A1 | 3/2014 | Liu et al. |
| 2014/0111019 A1 | 4/2014 | Roy |
| 2014/0333145 A1 | 11/2014 | Lee et al. |
| 2014/0361738 A1 | 12/2014 | Lee et al. |
| 2015/0198640 A1 | 7/2015 | Lee |
| 2015/0318708 A1 | 11/2015 | Bartlett |
| 2015/0349543 A1* | 12/2015 | Sakata ............... H02J 7/025 307/104 |
| 2015/0372493 A1 | 12/2015 | Sankar |
| 2016/0028443 A1* | 1/2016 | Kim ................ H02J 7/025 307/104 |
| 2016/0190852 A1 | 6/2016 | Chiang et al. |
| 2017/0223637 A1 | 8/2017 | Wang et al. |
| 2017/0264144 A1* | 9/2017 | Park ................ H02J 50/12 |
| 2018/0062504 A1 | 3/2018 | Mei et al. |

* cited by examiner

600

WIRELESS CHARGING SYSTEM WITH POWER LEVEL CALCULATION CIRCUIT FOR FOREIGN OBJECT DETECTION

BACKGROUND

The present invention relates generally to wireless charging systems and, more particularly, to techniques for detecting the presence of foreign objects in wireless charging systems.

In a conventional wireless charging system, a power source (referred to herein as a power-transmitting node or TX) transmits power wirelessly via inductive coupling to a power sink (referred to herein as a power-receiving node or RX) that is placed on or at least near the TX in order to charge or power the RX. The inductive coupling between a TX and an RX is achieved via resonant transducer circuitry in each node having similar if not identical resonant frequencies. To determine whether an RX is present, the TX will periodically or intermittently execute digital pings and, if present, an RX will respond by transmitting an ack message acknowledging its presence. The term "digital ping" refers to the TX inserting energy into its resonant transducer circuitry, which thereby transfers power to the RX's resonant transducer circuitry, which in turn causes the RX to transmit an ack message back to the TX. After receiving the ack message from the RX, the TX will initiate a power-transfer session to transmit power to the RX. During a power-transfer session, the RX will transmit CEP (control error packet) messages instructing the TX to increase or decrease its transmitted power level.

If a metal foreign objected (FO), like a coin, a key, or other metal object, is placed on or at least near the TX during a power-transfer session, inductive coupling between the TX and the FO may result in the generation of heat in the FO that can be a fire hazard or result in damage to the FO, the TX, and/or the RX. As such, the conventional TX is designed to monitor power loss during its power-transfer sessions, where power loss is defined as the amount of power transmitted by the TX that is not received by the RX.

To enable a TX to determine power loss, a conventional RX monitors its level of received power and periodically or intermittently transmits RP (received power) packets to the TX informing the TX of the RX's received power level. The TX monitors its level of transmitted power and determines the power loss as the difference between the TX's transmitted power level and the RX's received power level. If the TX determines that the power loss exceeds a specified power-loss threshold, then the TX determines that an FO is present, and in such case, the TX terminates the power-transfer session and enters a protection state in which the TX cannot transfer power to the RX.

The conventional RX determines its received power level by monitoring the current and voltage levels within its resonant transducer circuitry. Similarly, a conventional TX determines its transmitted power level by monitoring the current and voltage levels within its own resonant transducer circuitry. Since the RX and TX power levels vary over time, the TX will compare the current value of the RX's received power level with the current value of its own transmitted power level that corresponds to the same time period during which the RX measured its received power level.

When a CEP or RP packet is transferred from an RX to a TX during a power-transfer session, the current and voltage levels in the resonant transducer circuitries of the RX and the TX can be disrupted enough such that the respective determined received and transmitted power levels may be inaccurate. As such, the RX and the TX do not measure their respective received and transmitted power levels during periods of packet transfer.

FIG. 1 is a timing diagram representing processing implemented at the conventional RX and the conventional TX associated with the TX's detection of the presence of an FO. FIG. 1 represents an example time period during which the RX transmits two successive CEP packets followed by an RP packet. As indicated, the RX accumulates data corresponding to its received power level during time periods between transmissions of packets to the TX. The RX knows when to stop and start accumulation of its received power level data based on the known beginning and end of its transmission of each packet to the TX. Similarly, the TX accumulates data corresponding to its transmitted power level during periods between receipt of packets from the RX. The TX stops accumulating its transmitted power level data when the TX detects the beginning of each received packet and resumes data accumulation when the TX detects the end of each received packet.

For example, at the end of transmission of CEP packet #1, the RX resumes accumulating data corresponding to its received power level. Similarly, at the end of receipt of CEP packet #1, the TX resumes accumulating data corresponding to its transmitted power level.

At the beginning of transmission of CEP packet #2, the RX stops accumulating data corresponding to its received power level. Similarly, at the beginning of receipt of CEP packet #2, the TX stops accumulating data corresponding to its transmitted power level.

At the end of transmission of CEP packet #2, the RX resumes accumulating data corresponding to its received power level. Similarly, at the end of receipt of CEP packet #2, the TX resumes accumulating data corresponding to its transmitted power level.

At the beginning of transmission of the RP packet, the RX stops accumulating data corresponding to its received power level. Similarly, at the beginning of receipt of the RP packet, the TX stops accumulating data corresponding to its transmitted power level.

The RX's received power level information contained in the RP packet is generated by the RX based on a subset of its current accumulation of data corresponding to its received power level. In particular, as indicated in FIG. 1, the subset of data used by the RX corresponds to a timing window (whose duration is specified by the parameter "WINSIZE") that ends an offset time period (whose duration is specified by the parameter "OFFSET") before the beginning of transmission of the RP packet by the RX. Similarly, the TX generates its transmitted power level based on a subset of its current accumulation of data corresponding to its transmitted power level. In particular, as indicated in FIG. 1, the subset of data used by the TX corresponds to a timing window that is determined based on the same WINSIZE and OFFSET parameters relative to the beginning of receipt of the RP packet at the TX. Since the beginning of transmission of the RP packet by the RX substantially coincides with the beginning of receipt of the RP packet at the TX, the two timing windows are essentially identical. The TX then compares the RX's received power level to its own transmitted power level to detect whether an FO is present. Since the RX's received power level corresponds to the same time period as the TX's transmitted power level, the comparison provides a good indication of the presence or absence of a FO.

Note that the received and transmitted power levels are generated based on subsets of data accumulated just prior to the most-recent packet without including any data accumulated prior to any previously received packets. For example, in the example of FIG. 1, the data accumulated prior to CEP packet #2 is not used to generate the received and transmitted power levels by the RX and TX, respectively, after detecting the beginnings of transmission and receipt of the RP packet. Only data accumulated after CEP packet #2 is used.

There are times when a TX does not properly receive a packet transmitted from an RX. In that case, the RX's most-recent accumulated data will not correspond in time with the TX's most-recent accumulated data, so as described further below with respect to FIG. 2, with power levels that fluctuate over time, the TX's transmitted power level will be based on obsolete data, which can lead to false positive FO detection by the TX.

FIG. 2 is a timing diagram representing processing implemented at a conventional RX and a conventional TX associated with the TX's detection of a FO when a CEP packet is not properly received. The beginning of the timing diagram of FIG. 2 is the same as that of FIG. 1. In FIG. 2, however, the TX detects the start of CEP packet #2, but does not properly detect the end of that packet. As a result, the TX stops accumulation of its own transmitted power data when it detects the beginning of CEP packet #2, but the TX does not resume data accumulation at the end of CEP packet #2, because the TX fails to decode the CEP packet #2, and hence fails to detect the end of CEP packet #2. As a result, when the TX receives the RP packet from the RX, the information about the RX's received power level in the RP packet will be based on accumulated data within the appropriate timing window between the end of CEP packet #2 and the beginning of the RP packet, while the TX's transmitted power level will be based on accumulated data within the timing window between the end of CEP packet #1 and the beginning of CEP packet #2. Such a situation causes the TX to calculate an obsolete value for its transmitted power level, which can result in the TX generating a false positive detection of an FO. It would be advantageous to have a more-accurate power level calculation circuit in TX and RX nodes.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the invention are disclosed herein. However, specific structural and functional details disclosed herein are merely representative for purposes of describing example embodiments of the invention. The invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to certain embodiments of the present invention, a power-transmitting node (TX) of a wireless charging system continuously accumulates data corresponding to its transmitted power level throughout each power-transfer mode during which the TX transmits power wirelessly to a power-receiving node (RX). The TX detects the end of each received power (RP) packet received from the RX and identifies a subset of its own accumulated data to use to generate its transmitted power level used to detect presence of a foreign object (FO).

Figure 1:
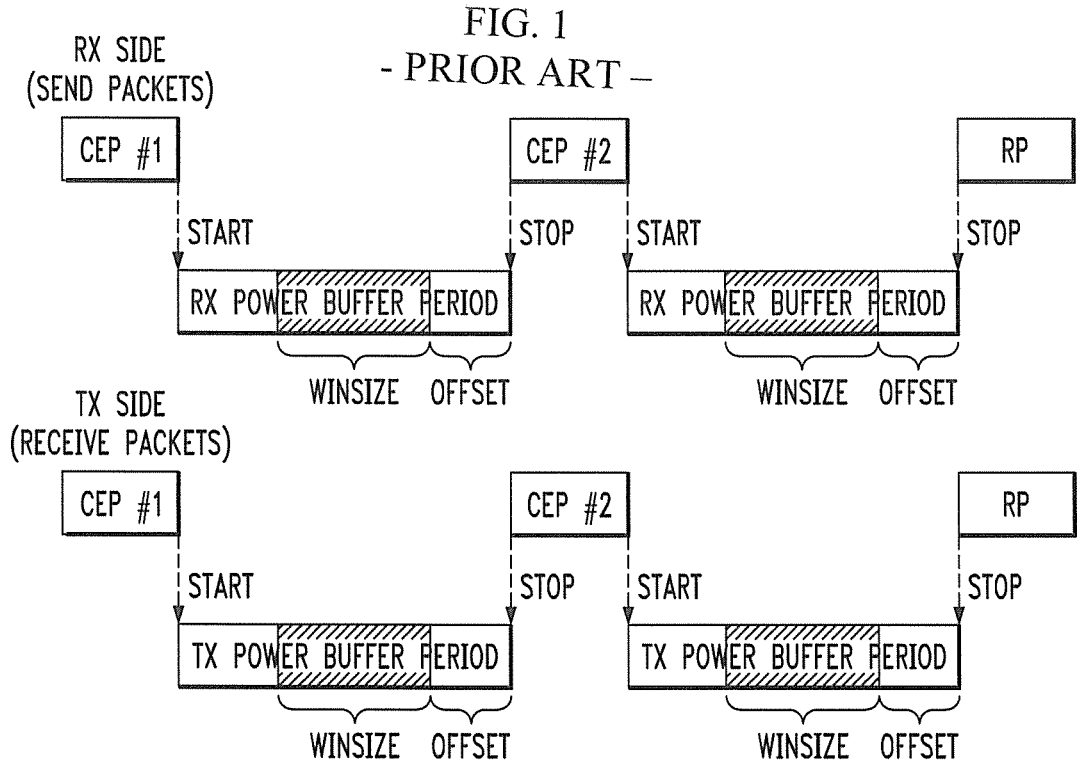
FIG. 1 is a timing diagram representing processing implemented at a conventional RX and a conventional TX associated with the TX's detection of FO presence.
Figure 3:
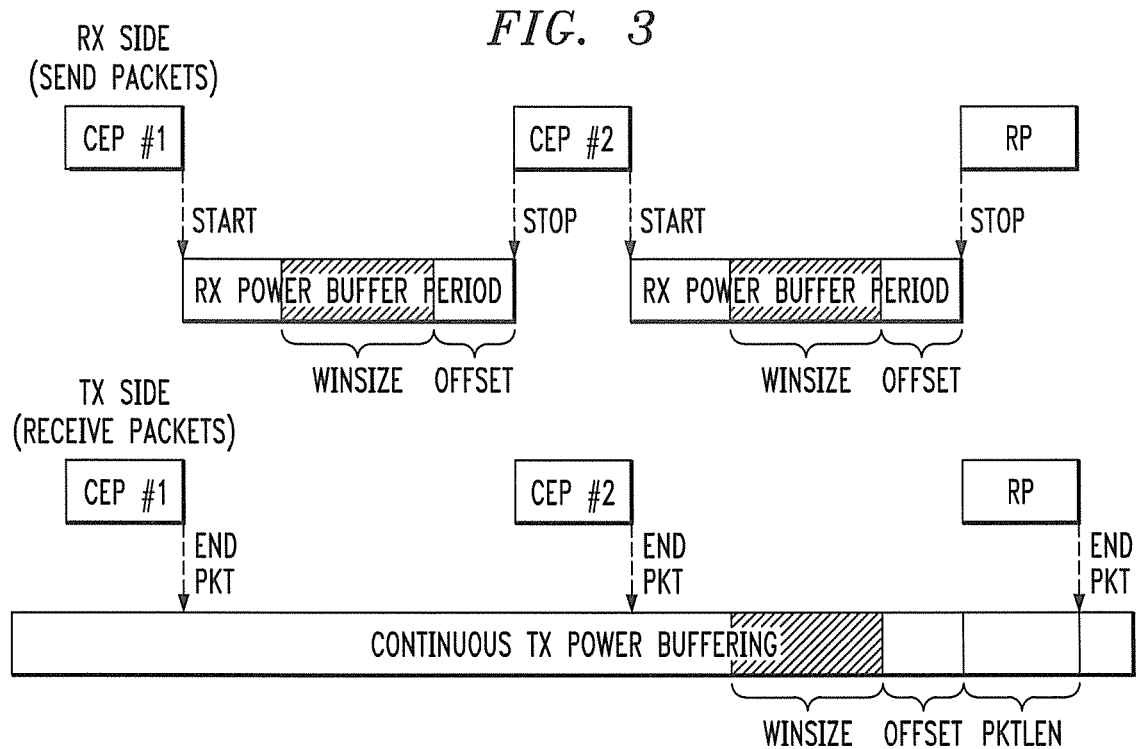
FIG. 3 is a timing diagram representing processing implemented at an RX and a TX associated with the TX's detection of FO presence, according to one embodiment of the invention.

Referring now to FIG. 3, a timing diagram representing processing implemented at an RX and a TX associated with the TX's detection of FO presence, according to one embodiment of the invention, is shown. Similar to FIG. 1, FIG. 3 represents an example time period during which the RX transmits two successive CEP packets followed by an RP packet. Similar to the conventional RX of FIG. 1, the RX of FIG. 3 accumulates data corresponding to its received power level during time periods between transmissions of packets to the TX and then uses a subset of that accumulated data to generate information about its received power level to be transmitted to the TX in the RP packet.

The processing performed by the TX of the present invention, however, is different from the processing of the conventional TX. In particular, the TX continuously accumulates data corresponding to its transmitted power level throughout a power-transfer session. The TX also keeps track of the timing of the end of each received packet from the RX. When the TX detects the end of a received RP packet containing the RX's received power level, the TX generates its own transmitted power level using a subset of its accumulated data corresponding to its own transmitted power level. In a presently preferred embodiment, the TX identifies the subset of accumulated data based on the same WINSIZE and OFFSET parameters used by the RX plus a PKTLEN parameter that indicates the known duration of an RP packet. As indicated in FIG. 3, the end of the timing window (of duration WINSIZE) is identified by backing off from the end of the received RP packet by a duration equivalent to the sum of the PKTLEN parameter and the OFFSET parameter. In this way, the TX can compare the RX's received power level with its own transmitted power level corresponding to the same time period.

Figure 2:
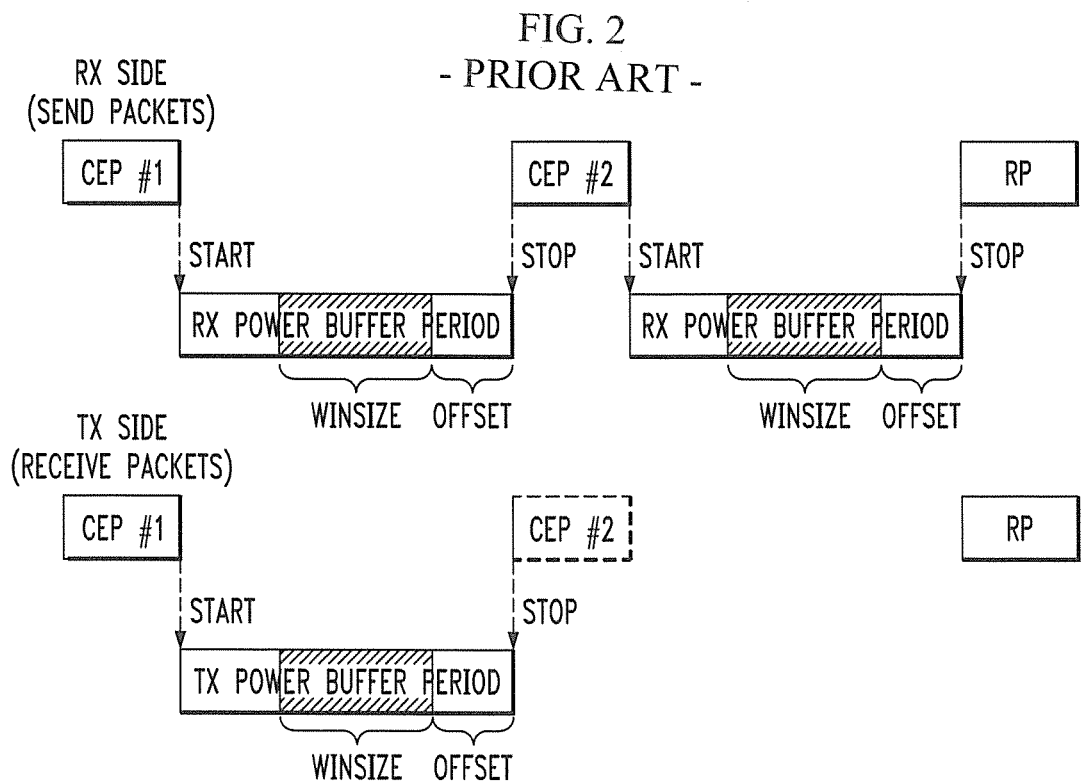
FIG. 2 is a timing diagram representing processing implemented at a conventional RX and a conventional TX associated with the TX's detection of FO presence when a CEP packet is not properly received.
Figure 4:
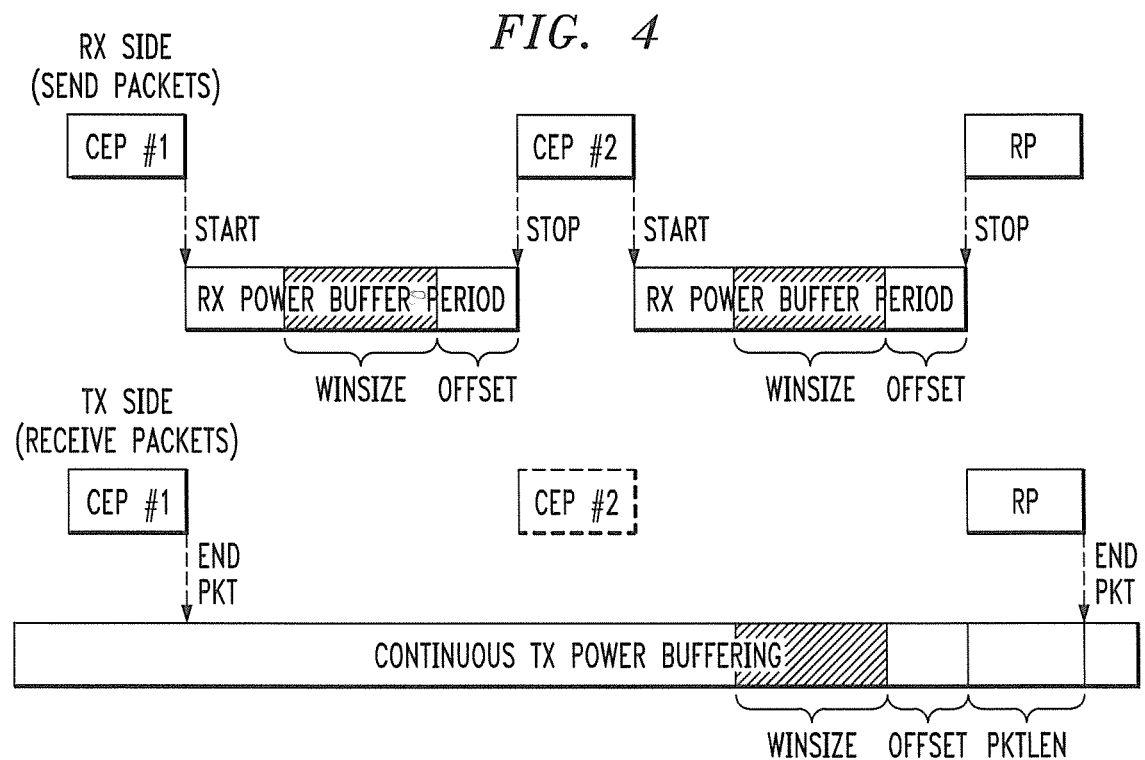
FIG. 4 is a timing diagram representing processing implemented at the RX and the TX of FIG. 3 associated with the TX's detection of FO presence when CEP packet #2 is not properly received, similar to the situation of FIG. 2.

FIG. 4 is a timing diagram representing processing implemented at the RX and the TX of FIG. 3 associated with the TX's detection of the presence of a FO when CEP packet #2 is not properly received, similar to the situation of FIG. 2. Here, since the selection of the subset of the TX's accumulated transmitted power data used to calculate the TX's transmitted power level is triggered by detecting the end of the received RP packet (as in FIG. 3), the fact that CEP packet #2 is not properly received does not adversely affect the selection of the subset of accumulated data. As a result, the TX of the present invention will compare the RX's received power level with its own transmitted power level corresponding to the same time period between the end of CEP packet #2 and the beginning of the RP packet.

Because the TX processing is triggered by detection of the end of packet receipt rather than the beginning of packet receipt, the processing will not be corrupted by those occurrences when the TX is able to detect the beginning of a particular packet, but not the end of that packet, as compared to the conventional processing of FIG. 2, which does get corrupted.

In some embodiments, the TX stores its transmitted power level data in a circular buffer such that the oldest data is overwritten by the newest data. The TX maintains pointers to keep track of the current location within the circular buffer as well as the locations of the data corresponding to periods of packet receipt.

In other embodiments, the TX stores its transmitted power level data in a non-circular buffer, such as a first-in, first-out (FIFO) linear shift register. Here, too, the TX maintains pointers identifying periods of packet receipt.

Although the invention has been described in the context of a scenario in which the CEP packet just before an RP packet (i.e., CEP packet #2 in FIG. 4) is not properly received, those skilled in the art will understand that the invention can also be implemented for scenarios in which one or more other CEP packets are not properly received either instead of or in addition to the CEP packet just before an RP packet.

Note that, if an RP packet is not properly received, then the TX will not calculate its transmitted power level, and the TX will not perform its FO detection processing. Instead, the TX will continue to accumulate data corresponding to its transmitted power level, while it waits for proper receipt of a subsequent RP packet.

Figure 5:
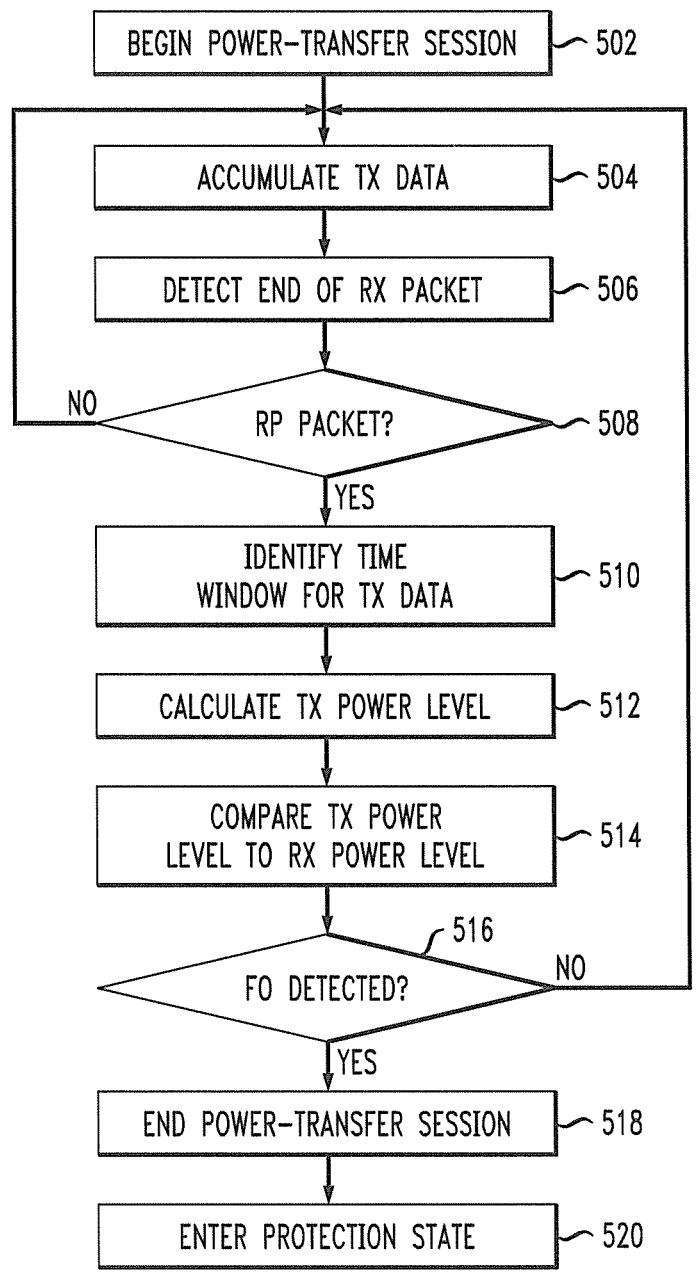
FIG. 5 is a flow chart of processing implemented by the TX of FIGS. 3 and 4 to detect the presence of an FO, according to one embodiment of the invention.

FIG. 5 is a flow chart of the processing performed by a TX of the present invention to detect the presence of an FO. Processing begins at step 502 with the TX beginning a power-transfer session during which the TX transfers power wirelessly to the RX. At step 504, throughout the power-transfer session, the TX accumulates data corresponding to its transmitted power level.

At step 506, the TX detects the end of a packet received from the RX, and, at step 508, the TX determines whether or not the packet was an RP packet. If the packet was not an RP packet (e.g., a CEP packet), then processing returns to step 504, where the TX continues to accumulate its transmitted power level data during the on-going power-transfer session.

If the TX determines that the packet was an RP packet at step 508, then processing continues to step 510, where the TX identifies the timing window corresponding to the subset of accumulated data in its transmitted power buffer to be used to calculate the transmitted power level.

At step 512, the TX calculates its transmitted power level using the accumulated data identified in step 510.

At step 514, the TX compares its transmitted power level calculated in step 512 to the RX's received power level identified in the RP packet and, at step 516, the TX uses that comparison to determine whether or not an FO is detected (e.g., if the difference between the TX's transmitted power level and the RX's received power level exceeds a specified threshold level, then an FO is detected). If an FO is not detected, then processing returns to step 504, where the TX continues to accumulate its transmitted power level data during the on-going power-transfer session.

If the TX detects the presence of an FO in step 516, then, at step 518, the TX ends the current power-transfer session and, at step 520, the TX transitions to its protection state.

Figure 6:
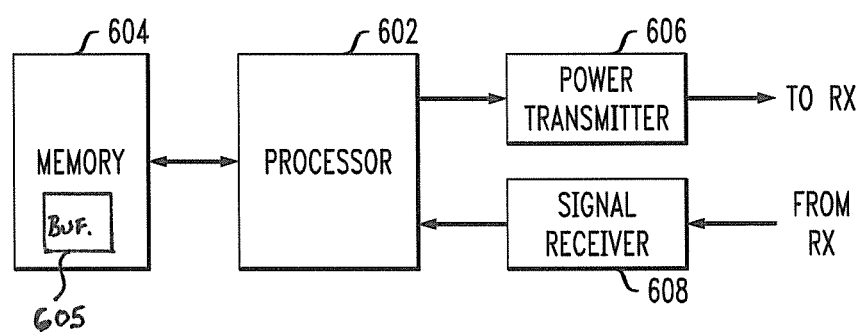
FIG. 6 is a simplified block diagram of a TX according to one embodiment of the invention.

FIG. 6 is a simplified block diagram of a TX 600 according to one embodiment of the invention. A processor 602 is provided that can implement the method described with reference to FIG. 5 to handle the scenarios discussed with reference to FIGS. 3 and 4. A memory 604, which is coupled to the processor 602, includes a buffer 605 that stores the accumulated data associated with the TX's transmitted power level. A power transmitter 606 transmits power wirelessly to an RX, and a signal receiver 608 receives CEP and RP packets from the RX. Note that, in typical implementations, the power transmitter 606 and the signal receiver 608 share resonant transducer circuitry that converts between wired and wireless electromagnetic signals. In other possible implementations, the power transmitter 606 and the signal receiver 608 may be completely distinct components.

The processor 602 may be implemented using dedicated hardware as well as hardware capable of executing appropriate software. The functions of the processor 602 may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP), network processor, application specific integrated circuit (ASIC), and/or field programmable gate array (FPGA) circuitry. Other hardware, conventional and/or custom, may also be included.

The memory 604 may be any suitable circuitry for storing data and/or software, such as read only memory (ROM), random access memory (RAM), and/or non-volatile storage, and may be integrated with the processor 602 and/or implemented as a distinct component.

Although the invention has been described in the context of a TX determining the end of the timing window by subtracting both the specified PKTLEN parameter and the specified OFFSET parameter from the time of the detected end of the received RP packet, in alternative embodiments, the TX can subtract a single parameter (equal to the sum of the PKTLEN and OFFSET parameters) from the end of the RP packet to determine the end of the timing window.

The invention has been described in the context of an embodiment in which the end of the timing window is determined based on the time of the detected end of the received RP packet. In another embodiment, the TX detects both the beginning and the end of a received RP packet, and uses the detection of the end of the RP packet to trigger the calculation of the TX's transmitted power level, and uses the time of the detected beginning of the RP packet to identify the end of the timing window (i.e., the OFFSET duration prior to the beginning of the RP packet). In such an embodiment, the TX does not need to be programmed with the specified PKTLEN value for the duration of an RP packet.

In some embodiments, a TX transmits power wirelessly to an RX in a wireless charging system. The TX comprises a processor, a memory, a power transmitter, and a signal receiver. The processor (i) accumulates data corresponding to transmitted power level of the TX, (ii) detects an end of an RP packet received from the RX, (iii) then identifies a subset of the accumulated data, and (iv) calculates the transmitted power level of the TX based on the subset of the accumulated data. The memory is used to store the accumulated data, the power transmitter transmits the power wirelessly to the RX, and the signal receiver receives the RP packet from the RX.

In some embodiments, the processor extracts a received power level of the RX from the received RP packet, and compares the transmitted power level of the TX with the received power level of the RX to detect presence of an FO.

In some embodiments, the processor identifies the subset of the accumulated data as the accumulated data within a timing window that ends a known duration prior to the end of the RP packet, while in other embodiments, the processor identifies the subset of the accumulated data as the accumulated data within a timing window that ends a known duration prior to a detected beginning of the RP packet.

In some embodiments, the processor continuously accumulates the data corresponding to the transmitted power level of the TX throughout a power-transfer session of the TX, and stores the accumulated data in a buffer in the memory.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A power-transmitting node (TX) for transmitting power wirelessly to a power-receiving node (RX) in a wireless charging system, the TX comprising:

a processor that (i) accumulates data corresponding to transmitted power level of the TX, (ii) detects an end of a received power (RP) packet received from the RX, (iii) then identifies a subset of the accumulated data, and (iv) calculates the transmitted power level of the TX using the subset of the accumulated data;
a memory that stores the accumulated data;
a power transmitter that transmits power wirelessly to the RX; and
a signal receiver that receives the RP packet from the RX.

2. The TX of claim 1, wherein the processor further extracts a received power level of the RX from the received RP packet and compares the transmitted power level of the TX with the received power level of the RX to detect a presence of a foreign object (FO).

3. The TX of claim 1, wherein the processor identifies the subset of the accumulated data as the data within a timing window that ends a known duration before the end of the RP packet.

4. The TX of claim 1, wherein the processor identifies the subset of the accumulated data as the accumulated data within a timing window that ends a known duration before a detected beginning of the RP packet.

5. The TX of claim 1, wherein the processor continuously accumulates the data corresponding to the transmitted power level of the TX throughout a power-transfer session of the TX.

6. The TX of claim 1, wherein the processor stores the accumulated data in a buffer in the memory.

7. The TX of claim 1, wherein:
the processor extracts a received power level of the RX from the received RP packet and compares the transmitted power level of the TX with the received power level of the RX to detect a presence of a foreign object (FO);
the processor continuously accumulates the data corresponding to the transmitted power level of the TX throughout a power-transfer session of the TX; and
the processor stores the accumulated data in a buffer in the memory.

8. The TX of claim 7, wherein the processor identifies the subset of the accumulated data as the accumulated data within a timing window that ends a known duration prior to the end of the RP packet.

9. The TX of claim 7, wherein the processor identifies the subset of the accumulated data as the accumulated data within a timing window that ends a known duration prior to a detected beginning of the RP packet.

10. A method for a wireless transmitter (TX) transmitting power wirelessly to a receiver (RX) in a wireless charging system, the method comprising:
transmitting the power wirelessly by the TX to the RX;
accumulating data corresponding to a transmitted power level of the TX, by the TX and storing the accumulated data in a memory of the TX;
detecting an end of an RP packet received from the RX;
after detecting the end of the RP packet, identifying a subset of the accumulated data; and
calculating the transmitted power level of the TX based on the subset of the accumulated data.

11. The method of claim 10, further comprising extracting a received power level of the RX from the received RP packet and comparing the transmitted power level of the TX with the received power level of the RX to detect the presence of an FO.

12. The method of claim 10, wherein the subset of the accumulated data is identified as the accumulated data within a timing window that ends a known duration before the end of the RP packet.

13. The method of claim 10, wherein the subset of the accumulated data is identified as the accumulated data within a timing window that ends a known duration before a detected beginning of the RP packet.

14. The method of claim 10, wherein the data corresponding to the transmitted power level of the TX is continuously accumulated throughout a power-transfer session of the TX.

15. The method of claim 10, wherein the accumulated data is stored in a buffer in the memory.

16. The method of claim 10, further comprising extracting a received power level of the RX from the received RP packet and comparing the transmitted power level of the TX with the received power level of the RX to detect presence of an FO, wherein:

the data corresponding to the transmitted power level of the TX is continuously accumulated throughout a power-transfer session of the TX; and the accumulated data is stored in a buffer in the memory.

17. The method of claim 16, wherein the subset of the accumulated data is identified as the accumulated data within a timing window that ends a known duration before the end of the RP packet.

18. The method of claim 16, wherein the subset of the accumulated data is identified as the accumulated data within a timing window that ends a known duration before a detected beginning of the RP packet.

* * * * *